Dec. 31, 1968    M. A. J. VERLINDEN    3,419,173
PRESSURE VESSEL MADE OF PLASTIC, ESPECIALLY A BEER CASK
Filed Oct. 6, 1966                    Sheet 1 of 2
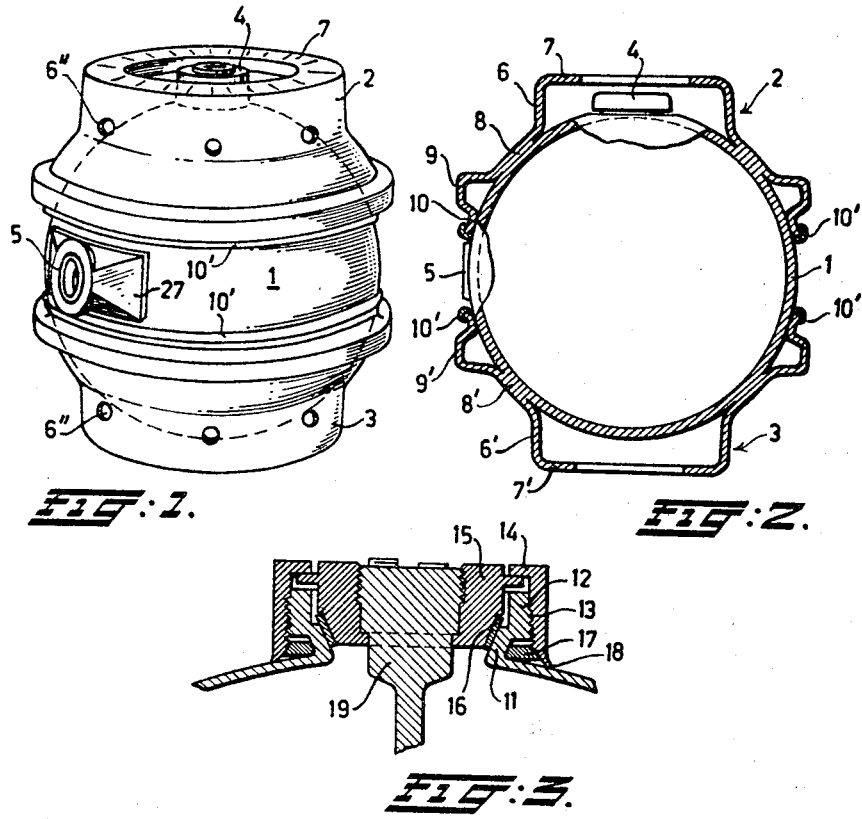
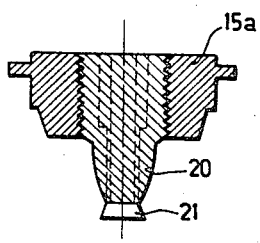

— # United States Patent Office 3,419,173
Patented Dec. 31, 1968

3,419,173
PRESSURE VESSEL MADE OF PLASTIC,
ESPECIALLY A BEER CASK
Marius Alphonsus Johannes Verlinden, Landrestraat 1061,
The Hague, Netherlands
Filed Oct. 6, 1966, Ser. No. 584,791
Claims priority, application New Zealand, Oct. 12, 1965,
143,119
3 Claims. (Cl. 220—5)

ABSTRACT OF THE DISCLOSURE

A pressure vessel in which end caps are mounted on a container to form an elongated barrel shape for the vessel, the container being constituted of plastic material. An aperture is formed at one end of the container and a closure is provided at the aperture which is adapted for a dispensing device to enable removal of the contents.

---

My invention relates to a plastic pressure vessel, especially a beer cask, provided with at least one aperture and which is resistant to internal pressure.

The conventional wooden beer cask has been widely used in large numbers but it has certain disadvantages which have induced people to seek manufacture of such casks from metal or one of the modern plastic materials. The known disadvantages of wooden casks, are: the expensive construction required in order to avoid leakage between the staves of which the cask is composed, the high weight, the risk of injuries from wood splinters, and the fact that the wood structure fosters the development of mould, so that these barrels should be frequently and very carefully cleaned and treated again with pitch. All breweries, however, are used to handling wooden casks so that substitute barrels should at least have approximately the same shape. Aluminum barrels made in replacement of wooden casks are very expensive and lack resistance to corrosion; the aluminum must be subjected to an expensive surface treatment lest the life of the barrels is too short. The use of stainless steel for the manufacture of the barrels is disadvantageous in that this material is very expensive and moreover a barrel made thereof has a rather high weight. Both aluminum and stainless steel barrels are disadvantageous in that they are easily dented, so that it is necessary, when they are returned to the brewery for refilling to inspect them carefully and to hammer out the dents in order to bring the volume again to its nominal value.

A plastic which is suitable for the manufacture of beer barrels is low pressure polyethylene. Various beer barrels made of this material are available in the market which all have the shape of the conventional wooden cask and for that reason are not quite satisfactory in practice. Owing to the use of flat or inwardly bulging bottoms it is difficult to empty the cask completely on drawing off beer; beer residues gather easily at these locations where the surfaces abruptly merge and these residues may give rise to the formation of mould.

Moreover these junctions are just the locations where the cask will most likely rupture when high internal pressures are produced. Finally if it is desired to manufacture a cask of the usual shape from plastic and if this cask should have a sufficient strength, then its bottom and walls should consist of very thick material, so that the cask is heavy and expensive.

It is an object of my invention to provide a beer cask of the kind as mentioned above, which cask, also when a comparatively small thickness of wall is applied, can resist the internal pressure produced in operation and is capable of being almost entirely emptied on drawing off while allowing for perfect cleaning so that all beer residues can be removed, the cask having therefore no inaccessible spots, while nevertheless, as the conventional casks, is capable of being easily stacked and rolled. To this may be added that the construction is such that the cask can be manufactured in mass production at a cheap price by conventional procedures.

An object of my invention is to provide a container with at least one aperture and with semispherical, outwardly bulging, upper and lower ends, which spherical parts are each enclosed by an end cap, the latter consisting of an almost cylindrical casing part with an annular flange which is directed to the axis of the cylinder, the said casing part via a bridge piece, which extends along the spherical surface and which is secured to the spherical container part, merging into a hollow rolling edge which protrudes from the surface of the sphere, the setback wall portion of the said edge ending at the wall of the container.

The usual tap rod can reach as far as the lowest point of the container so that the cask can easily be completely emptied. Since the container itself is almost entirely spherical and, if a maximum resistance to internal pressure is desired, it can be constructed so as to be purely spherical, and practically no changes in the volume are produced; due to this shape it is almost impossible to form dents in the cask. The flat flanges permit the casks to be stacked, while the rolling edges enable the cask to be rolled. The end caps also effectively protect the cask against external influences, the flange constituting a handle which facilitates carrying. It is possible to secure each end cap to the container at the bridge part at two annular surface parts.

With plastic casks it has always been a problem to fit the accessories required for drawing beer from and filling beer in the barrel. For drawing beer from a barrel, in general, an extractor body with a tap rod is used, which through an aperture (initially closed by means of a cork or a rubber stopper, in a bung screwed into the barrel wall) is introduced into the barrel, $CO_2$ under pressure being introduced into the barrel and simultaneously via a suitable channel, the beer is drawn off. Especially in the English speaking countries a cask with a special tap rod, fixed to the bung is often used, the required connections to this tap rod in this case being provided from the outside, the tap rod remaining in the cask when the latter is cleaned. The cask should be constructed in such a way that no metal pieces need be used in order to provide the various connections, since the coefficient of expansion of plastic and metal differ greatly and connections with metal clamping rings give rise to leakage after a lapse of time.

It is another object of my invention to provide an aperture in the wall of the container which aperture is bounded by a neck, the latter consisting of a truncated cone part, which adjoins the container wall, and a cylindrical part with external screw thread about which a clamping ring provided with a flange can be screwed, the flange being directed to the center of the aperture, while an insert of a definitive shape and nature fits in the neck orifice which, if need be by means of a sealing ring bears against the conical wall part and which is retained by the flange of the clamping ring. A thinned cylindrical end of the clamping ring preferably resiliently contacts the wall of the cask, two or more glands being provided between the clamping ring and the outer circumference of the neck so as to bear against these parts.

In the aforementioned embodiments the insert can be adapted to the extractor body or tap rod which will be used in the cask; it is, however, also possible to provide in the barrel a tap rod fixed to the bung by means of a suitable shaped insert, while the cask may also be closed by a solid stopper. In many cases the purchaser wants also an aperture with a removable stopper to be provided in the side wall of the container. This aperture should, however, not protrude from the cask wall to prevent damage to the cask when it is rolled and conveyed while, with a view to the construction of the usual cask-washing apparatus it is necessary that in the surrounding parts of this aperture there are no abrupt junctions in the surface. It is furthermore required that the washing water can easily flow down from this aperture so that after washing of the cask no residues can remain in it.

A still further object of my invention is to provide a beer barrel in which an aperture is formed in the wall of the container, the said aperture having a flat wall boundary, in which fits an insert which lies partially within the container and is secured against rotation, the said insert consisting of a cylindrical part, protruding from the container and provided with external screw thread, and a flange which is in sealing contact with the wall of the container; the insert being further provided with an arbitrarily dimensioned and shaped bore. The said cylindrical part is enclosed by a cover plate with a cylindrical bore and a progressively increasing thickness, which cover plate lies against the outer wall of the container. In the outer surface of this cover plate a shallow groove is formed, surrounding the bore, wherein is fitted a screw-threaded clamping ring which can be screwed about the cylindrical part of the insert. The cover plate can be fixed permanently to the wall of the container.

My invention further aims to provide a number of radial channels in the flange of the insert, the said channels extending from the outer edge to the bore, these channels ensuring that no liquid residues remain around the aperture.

The aforementioned construction ensures an adequate sealing of the cask, while the wall at the location of the aperture is additionally supported. In this case, too, the insert may be arbitrarily constructed and arranged to accommodate a simple closing stopper or a bung.

A more complete understanding of my invention, and of further objects and features thereof will become evident from the following description of illustrative embodiments thereof, when considered in connection with the accompanying drawings wherein:

FIG. 1 is a perspective view of a beer cask according to the invention.

FIGURE 2 is a vertical section through this cask.

FIGURE 3 shows a detail of the cask viz. the shape of the neck with associated closure.

FIGURE 3a shows another embodimnet of an insert to be used with the closure according to FIGURE 3.

Figure 4:
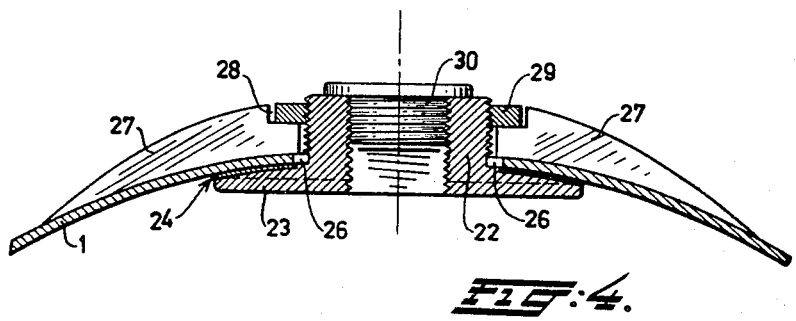
FIGURE 4 shows the way in which an aperture provided in a side wall of the cask is sealed.
Figure 4A:
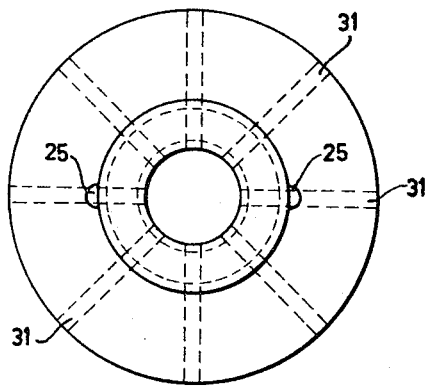
FIGURE 4a shows a plan view of an insert to be used therein.

The cask shown in the drawing consists of a container 1 containing the liquid and which is enclosed by two end caps 2, 3, respectively. In the embodiment represented the container 1 is spherical and has therefore a maximum resistance to any pressure produced in the cask, so that for a definite value of this pressure a comparatively small thickness of wall suffices. If desired the spherical shape can be modified in such a way that the cask has a narrow almost cylindrical central portion which is adjoined by two semispherical end parts. The constructive details of such an embodiment correspond with the details to be discussed hereinafter.

The container 1 which is shown in FIGURE 1 is provided with an upper aperture 4 and a side aperture 5. The end caps 2 and 3 each consists of a cylindrical part 6, 6' respectively which on the one side merges into a cylindrical flange 7, 7' respectively and on the other side via bridge piece 8, 8' into a rolling edge 9, 9' respectively.

The end cap is with its bridge part 8, 8' secured to the container 1 by means of one of the known technical processes. The end edge 10, 10' according to the represented embodiment resiliently contacts the container 1; it is however, also possible to secure this terminal edge 10 to the container 1. In order to prevent dirt or moisture from amassing in the hollow rolling edge, an additional, elastic, sealing ring 10' may be provided, which consists of a thin central portion with thickened longitudinal edges and which is retained by the slightly outwardly bent edge of the terminal edge 10. It is, however, also possible to fill the hollow rolling edge with foam plastic. Furthermore an embodiment is possible in which a string is drawn taut around the edge to draw the sealing ring against the container. The rolling edges 9, 9' permit the beer casks to be transported and displaced in the usual way; the upper wall of the flanges 7 and 7' is preferably corrugated, so that the casks may be stacked without sliding on one another. Finally the end portions of the flanges 7, 7' form a grip by means of which the casks can easily be carried. Apertures 6" are provided in the casing part 6 to ensure that on cleaning the cask, the washing water can freely escape.

FIGURE 3 represents how the aperture in the container wall can be closed as proposed by the invention. This aperture in the wall of the container 1 is bounded by an upright neck which consists of a conically and outwardly widened part 11 and a cylindrical part 12, provided with external screw thread, which adjoins the conical part. Around this cylindrical part 12 fits a clamping ring 13 the inwardly directed flange 14 of which retains an insert 15.

This insert is at its lower end provided with a conical surface which through the sealing ring 16 is pressed against the conical inner surface of the part 11. The pieces 17 which are provided around the neck part 11 and which are clamped between this part and the lower edge of the clamping ring 13 prevent, upon tightening of the clamping ring 13, the neck 11 can deviate outwardly, while the neck is also prevented from widening when the inner pressure increases, so that no leakage can occur. The clamping ring 13 itself ends in a thin terminal edge 18 which resiliently contacts the outer wall of the container 1.

The insert 15 may be constructed in any desired way. FIGURE 3 shows an insert which is provided with a screw thread adapted to that of a tap rod fixed to a special bung 19 as used by some breweries in their casks. FIGURE 3a shows an insert 15a, which is devised for accommodating the usual bung 20, of which the bore can be closed by a stopper 21, which in known manner is inserted in the barrel when the tap rod is introduced.

It is obvious that for any dispensing equipment used by any brewery a fitting insert (bung) can be manufactured.

As already stated it is, however, in many cases desired that also in the side wall of the cask there is provided an aperture which is capable of being closed. FIGURE 4 shows an embodiment with such an aperture with the relative parts. Here it is also possible to use both a simple closing stopper or a tap rod in the closure, the flat wall limitation ensuring that no beer residues or washing fluid remain along the edges of the closure.

Within the barrel is an insert 22 the flange 23 of which contacts the wall of the cask 1 through a packing ring 24; the radially protruding cams 25, which fit in corresponding recesses 26 in the edge of the aperture in the barrel, prevent the insert 22 from rotating with respect of the cask wall. On the outer side of the cask is a cover plate 27 (see also FIG. 1) in which is provided a groove 28; the clamping ring 29, which can be screwed about the insert 22, fits in said groove. FIGURE 4 shows the insert being closed by means of a stopper 30, but as is indicated hereinbefore a bung with a tap rod can also be screwed into the insert.

In the flange 23 there are a number of radial channels 31 which ensure that all liquid residues are removed when washing the cask, the said channels extending from the edge of the flange to the bore. By means of these channels almost any liquid residues can flow out through the bore.

Finally the cover plate 27 is shaped in such a way that its thickness gradually increases from the edges towards the central portion thereof so that the cask can be used with the conventional washing apparatus in which a spring loaded nozzle is inserted in the cask via a bore in the insert 22.

The closures described hereinbefore are advantageous in that they can entirely be made of plastic, whereby difficulties caused by the unequal coefficients of expansion of plastic and metal are not experienced and no leakage occurs even when the cask is used for a long time at changing temperatures.

It lies within the scope of the invention to form in a cask only a closure as shown in FIGURE 3 or 4, while it is also possible to form in a spherical end part of the container a closure as shown in FIGURE 4.

Having thus described the invention what is claimed as new and desired to be secured by Letters Patent is:

1. A pressure vessel comprising a container of plastic material having at least one aperture therein, end caps of plastic material mounted on said container to define an elongated barrel shape for the vessel, said end caps including a cylindrical portion, and an annular flange on said cylindrical portion defining an opening, one of said caps encircling said aperture such as the opening in the cap provides access to said aperture, said container including a neck bounding said aperture, said neck including a truncated conical portion and a terminal cylindrical portion which has an external thread thereon, a clamping ring of plastic material threadably engaged with said cylindrical portion and including an upper inwardly directed flange, an insert in said aperture in sealing contact with said conical portion of the neck and retained in the aperture by said flange of the clamping ring, said clamping ring including a depending annular flange of diminishing thickness which resiliently contacts said container, and filling pieces clamped between the clamping ring and said neck in the region of said depending annular flange.

2. A vessel as claimed in claim 1 wherein said insert includes an external annular flange thereon which is interposed between said neck and said inwardly directed flange of said clamping ring and is engaged by the latter.

3. A vessel as claimed in claim 2 wherein said insert includes a bung threadably engaged therein.

References Cited

UNITED STATES PATENTS

| 1,332,998 | 3/1920 | Rosenfeld | 220—39 X |
| 1,565,378 | 12/1925 | Long | 220—39 |
| 2,250,749 | 7/1941 | Cornelius. | |
| 2,333,968 | 11/1943 | Winter | 220—39 X |
| 3,294,271 | 12/1966 | Armbruster | 220—83 X |

FOREIGN PATENTS

| 301,297 | 11/1928 | Great Britain. |
| 1,127,789 | 4/1962 | Germany. |

GEORGE E. LOWRANCE, *Primary Examiner.*

U.S. Cl. X.R.

220—39, 71